(12) United States Patent
Melendez

(10) Patent No.: US 11,372,428 B2
(45) Date of Patent: Jun. 28, 2022

(54) METHODS AND SYSTEMS FOR AUTOMATIC DESCENT MODE

(71) Applicant: Honeywell International Inc., Morris Plains, NJ (US)

(72) Inventor: Luis Melendez, Scottsdale, AZ (US)

(73) Assignee: Honeywell International Inc., Charlotte, NC (US)

( * ) Notice: Subject to any disclaimer, the term of this patent is extended or adjusted under 35 U.S.C. 154(b) by 425 days.

(21) Appl. No.: 16/570,781

(22) Filed: Sep. 13, 2019

(65) Prior Publication Data

US 2021/0080978 A1   Mar. 18, 2021

(51) Int. Cl.
| | |
|---|---|
| *G05D 1/06* | (2006.01) |
| *G05D 1/10* | (2006.01) |
| *B64C 13/16* | (2006.01) |
| *G08G 5/00* | (2006.01) |

(52) U.S. Cl.
CPC .......... *G05D 1/0688* (2019.05); *B64C 13/16* (2013.01); *G05D 1/106* (2019.05); *G08G 5/0021* (2013.01); *G08G 5/0039* (2013.01)

(58) Field of Classification Search
CPC ...... G05D 1/0688; G05D 1/106; B64C 13/16; G08G 5/0021; G08G 5/0039
See application file for complete search history.

(56) References Cited

U.S. PATENT DOCUMENTS

| | | | | |
|---|---|---|---|---|
| 3,737,119 A * | 6/1973 | Cheng | ..................... | B64C 23/04 244/1 N |
| 6,507,776 B1 | 1/2003 | Fox, III | | |
| 8,078,345 B2 * | 12/2011 | Botargues | ............ | G05D 1/0688 701/16 |
| 8,145,366 B1 * | 3/2012 | Haering, Jr | ............ | G01C 23/00 701/14 |
| 9,199,724 B2 | 12/2015 | Pastor | | |
| 9,423,799 B1 * | 8/2016 | Wu | ....................... | G08G 5/0091 |

(Continued)

FOREIGN PATENT DOCUMENTS

EP    3534120 A1    9/2019

OTHER PUBLICATIONS

Extended European Search Report dated Feb. 5, 2021 in counterpart European Patent Application No. 20194210.9 (12 pages, in English).

(Continued)

*Primary Examiner* — Nicholas Kiswanto
*Assistant Examiner* — Jamal A Shah
(74) *Attorney, Agent, or Firm* — Bookoff McAndrews, PLLC

(57) ABSTRACT

Disclosed are methods, systems, and non-transitory computer-readable medium for controlling an automatic descent of a vehicle. For instance, the method may include: determining whether a descent trigger condition is present; and in response to determining the descent trigger condition is present, performing an automatic descent process. The automatic descent process may include: obtaining clearance data from an on-board system of the vehicle; generating a descent plan based on the clearance data, the descent plan including a supersonic-to-subsonic transition and/or a supersonic-descent to a target altitude; and generating actuator instructions to a control the vehicle to descend to the target altitude based on the descent plan.

20 Claims, 5 Drawing Sheets

(56) References Cited

U.S. PATENT DOCUMENTS

| | | | | |
|---|---|---|---|---|
| 9,536,435 B1* | 1/2017 | Shay | .................. | G08G 5/0034 |
| 2014/0343761 A1* | 11/2014 | Pastor | .................. | B64C 13/18 |
| | | | | 701/7 |

OTHER PUBLICATIONS

Richardson, Donald W. "Practical considerations in commercial supersonic transport flight operations." Journal ol Aircraft 2.2 (1965): 66-71 (6 pages, in English).

Smith-Velazquez, Laura M., et al. "Synthetic vision display with integral sonic boom predictions." Degraded Environments: Sensing, Processing, and Display 2017. vol. 10197. International Society for Optics and Photonics, 2017. (14 pages, in English).

* cited by examiner

METHODS AND SYSTEMS FOR AUTOMATIC DESCENT MODE

TECHNICAL FIELD

Various embodiments of the present disclosure relate generally to methods and systems for an automatic descent mode of a vehicle and, more particularly, to methods and systems for an automatic descent mode for supersonic flight of a vehicle.

BACKGROUND

Generally, supersonic flight may present several challenges. For instance, as a first example, supersonic flight may be limited by certification authorities (e.g., FAA), such as minimum/floor requirements that dictate a minimum altitude that a vehicle may cruise at supersonic or maximum mach speed requirements (based on altitude) for a geographic region, etc. As a second example, supersonic vehicles may consider when and where to end an automated descent, especially with consideration of any sonic booms generated by a transition maneuver to perform the automated descent. Therefore, determining a transition maneuver for an automated descent mode of a vehicle and executing the transition maneuver out of supersonic flight, may be a challenge.

The present disclosure is directed to overcoming one or more of these above-referenced challenges.

SUMMARY OF THE DISCLOSURE

According to certain aspects of the disclosure, systems and methods are disclosed for an automatic descent mode for supersonic flight of a vehicle.

For instance, a method may include: determining whether a descent trigger condition is present; and in response to determining the descent trigger condition is present, performing an automatic descent process. The automatic descent process may include: obtaining clearance data from an on-board system of the vehicle; generating a descent plan based on the clearance data, the descent plan including a supersonic-to-subsonic transition and/or a supersonic-descent to a target altitude; and generating actuator instructions to a control the vehicle to descend to the target altitude based on the descent plan.

A system may include a memory storing instructions; and a processor executing the instructions to perform a process. The process may include: determining whether a descent trigger condition is present; and in response to determining the descent trigger condition is present, performing an automatic descent process. The automatic descent process may include: obtaining clearance data from an on-board system of the vehicle; generating a descent plan based on the clearance data, the descent plan including a supersonic-to-subsonic transition and/or a supersonic-descent to a target altitude; and generating actuator instructions to a control the vehicle to descend to the target altitude based on the descent plan.

A non-transitory computer-readable medium may store instructions that, when executed by a processor, cause the processor to perform a method. The method may include: determining whether a descent trigger condition is present; and in response to determining the descent trigger condition is present, performing an automatic descent process. The automatic descent process may include: obtaining clearance data from an on-board system of the vehicle; generating a descent plan based on the clearance data, the descent plan including a supersonic-to-subsonic transition and/or a supersonic-descent to a target altitude; and generating actuator instructions to a control the vehicle to descend to the target altitude based on the descent plan.

Additional objects and advantages of the disclosed embodiments will be set forth in part in the description that follows, and in part will be apparent from the description, or may be learned by practice of the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Various embodiments of the present disclosure relate generally to methods and systems for an automatic descent mode of a vehicle.

In general, the present disclosure is directed to systems and methods for an automatic descent mode of a vehicle. For instance, a system of the present disclosure may determine whether a descent trigger condition is present; and, if so, perform an automatic descent process. The automatic descent process may include obtaining clearance data; generating a descent plan based on the clearance data; and generating actuator instructions to execute the descent plan. Specifically, the descent plan may include a supersonic-to-subsonic transition and/or a supersonic descent to a target altitude, so as to get to a target altitude as soon as possible after the descent trigger condition is present. Furthermore, the system of the present disclosure may check that the descent plan includes a descent maneuver that avoids populated areas, supersonic flight restriction areas, and/or weather, and aims for corridors where the vehicle may fly at the target altitude, so as to reduce sonic booms over populated areas, avoid areas where sonic booms are not allowed, and avoid weather (as weather is a complication in already non-standard operating condition). Moreover, the system of the present disclosure, may override a supersonic flight restriction automatically, in response to a user input, or based on a population analysis (e.g., to move any sonic booms to a lesser populated area). Therefore, the systems and methods of the present disclosure may determine a transition maneuver for an automated descent mode of a vehicle and execute the transition maneuver out of supersonic flight, while considering various criteria (e.g., corridors, population, weather, and/or supersonic flight restrictions).

While this disclosure describes the systems and methods with reference to aircraft, it should be appreciated that the present systems and methods are applicable to management of vehicles, including those of drones, or any other autonomous flight vehicle, or spacecraft.

Figure 1:
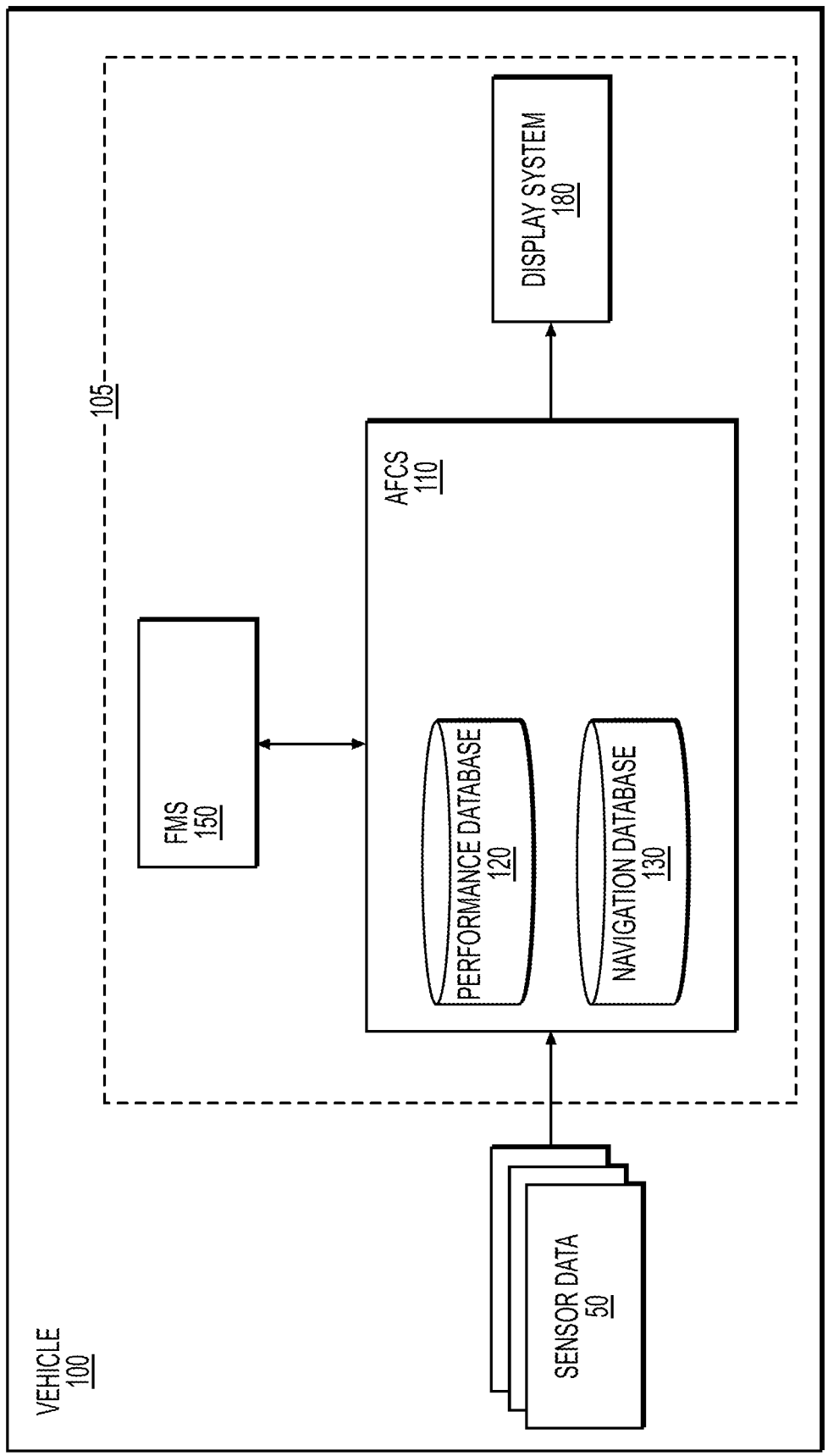
FIG. 1 depicts an exemplary block diagram of a system for an automatic descent mode of a vehicle, according to one or more embodiments.
Figure 2:
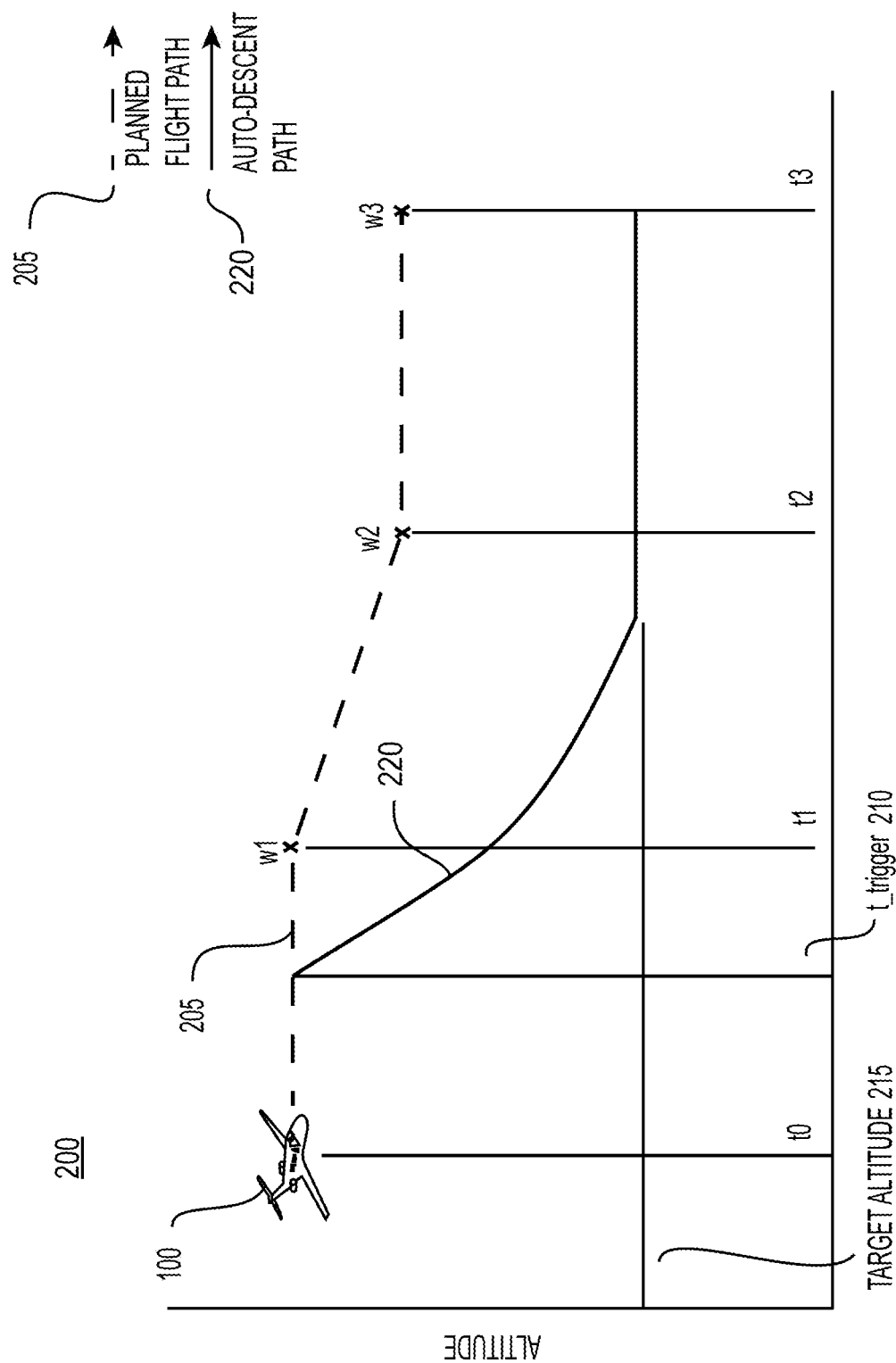
FIG. 2 depicts an exemplary system environment for an automatic descent mode of a vehicle, according to one or more embodiments.

FIG. 1 depicts an exemplary block diagram of a system for an automatic descent mode of a vehicle, according to one or more embodiments. FIG. 2 depicts an exemplary system environment for an automatic descent mode of a vehicle, according to one or more embodiments. The system may be a vehicle 100, such as a supersonic aircraft, that is operating in the exemplary system environment 200 of FIG. 2. However, the vehicle 100 may also be a supersonic drone (e.g., an un-maned aircraft), a rocket, or a spacecraft. The vehicle 100 may include an auto-throttle control system (AFCS) 110 (or, a fly by wire system), a flight management system (FMS) 150, and a display system 180 (or, generally, a user interface system). The AFCS 110, the FMS 150, and the display system 180 may be a part of a control system 105 of the vehicle 100, such as in a cockpit of an aircraft.

The FMS 150 may store a flight plan of the vehicle 100, and manage the flight plan of the vehicle 100, such as by user or system inputs. As depicted in FIG. 2, the flight plan may have a planned flight path 205 between various points (e.g., waypoints, such as waypoint w1, waypoint w2, and waypoint w3, at time t1, t2, and t3, respectfully). The flight plan may indicate that at waypoint w1 the vehicle 100 may change altitude or transition from (1) supersonic to subsonic flight or (2) subsonic to supersonic flight (referred to herein as "transition point"). Notably, however, the flight plan may indicate a transition at a different point, other than a named waypoint, such as before or after waypoint w1. One of skill in the art would understand that flight plans may indicate transition points based on various criteria, such as restricted airspace, efficient use of fuel, weather conditions, etc. Furthermore, the flight plan may be updated before and/or during a flight of the vehicle 100, such as by pilot or system inputs to the FMS 150.

The AFCS 110 may control actuation systems of the vehicle 100 to control the vehicle 100 along a flight path curve of a maneuver, such as an automated descent maneuver that has an auto-descent path 220. The automated descent maneuver may be one of a plurality of maneuvers programmed into the FMS 150 or the AFCS 110 (e.g., in the navigation database 130). The plurality of maneuvers may be designed based on circumstances (e.g., starting altitude, weather conditions, center of gravity (CG), etc.) for vehicle 100 (e.g., for all vehicles of a type similar or same as the vehicle 100). Generally, the plurality of maneuvers may be flight path curves that indicate an altitude, attitude, and/or speed, with respect to time, of the vehicle 100 through a maneuver. The plurality of maneuvers may be stored in the performance database 120, e.g., with identifiers.

The actuation systems of the vehicle 100 may include motors, engines, and/or propellers to generate thrust, lift, and/or directional force for the aircraft 131; and flaps or other control surfaces to augment the thrust, lift, and/or directional force for the vehicle 100. The AFCS 110 may collect sensor data 50 from various sensors installed on the aircraft, and may also receive navigation and performance-related data from external systems via wired and/or wireless connection. The received data may be stored in one or more databases of the FMC 110, such as the performance database 120 and the navigation database 130, depending on the data type. For example, aerodynamic and engine performance models of the airplane, maximum take-off weight, fuel weight and distribution models, CG models and CG thresholds, drag models, etc., may be stored in the performance database 120. The aerodynamic and engine performance models may include a flight envelope for maneuvers of the vehicle 100, and a prediction model, discussed in detail below. The information stored in the performance database 120 may be used to predict performance of the vehicle in a maneuver, such as the.

The navigation database 130 may store information related to navigation or routing of the aircraft in a geographic area. In particular, the navigation database 130 may contain data elements that indicate restrictions on vehicle maneuvers, such as supersonic flight restrictions. The supersonic flight restrictions may indicate three-dimensional zones in which supersonic flight is not allowed or is allowed but in a limited manner. The information stored in the navigation database 130 may also include, for example, waypoints, airports, runways, airways, radio navigation aids, holding patterns, etc.

In one aspect of the disclosure, the AFCS 110 may perform a trigger process. The trigger process may include: obtaining a flight plan of a vehicle and sensor data from other systems of the vehicle; monitoring progress of the vehicle through the flight plan and the sensor data to determine whether a descent trigger condition is present; and in response to determining the descent trigger condition is present, performing a supersonic flight entry/exit process. The trigger process may further include: in response to determining the descent trigger condition is not present, returning to monitoring the progress and the sensor data.

To obtain a flight plan of a vehicle, the AFCS 110 may request a copy (or portion thereof) of the flight plan from the FMS 150. Moreover, the AFCS 110 may receive updates to the flight plan from the FMS 150, during the flight. To obtain the sensor data 50, the AFCS 110 may continually/periodically request/receive the sensor data 50 from other systems of the vehicle. For instance, the AFCS 110 may receive cabin pressure data from a cabin pressure sensor, status information of a life system, structural information from sensing devices, etc. Generally, the sensor data 50 may include data that corresponds to, or is indicative of, health and safety sensitive situations, in case of which an automated descent mode may be triggered (referred to as "safety data" of the sensor data 50).

To monitor progress of the vehicle through the flight plan, the AFCS 110 may receive positioning data (e.g., GPS data, heading data, track data, etc.) from among the sensor data 50; and compare the positioning data to points of the planned flight path 205. For instance, the AFCS 110 may determine the positioning data indicates the vehicle 100 is a distance away (or time away) from a next point on the planned flight path 205.

To monitor the sensor data 50, the AFCS 110 may compare the safety data (from among the sensor data 50 to safety thresholds. For instance, the AFCS 110 may determine whether the safety data (or components thereof) are above, below, within relevant safety thresholds. As an example, the AFCS 110 may obtain cabin pressure data indicating a pressure of an internal compartment of the vehicle 100; compare the cabin pressure data to a cabin pressure threshold to determine if the cabin pressure is above the cabin threshold. As another example, the AFCS 110 may obtain status information of a life system indicating a gas mixture and/or life system operational state (e.g., working, degraded, inoperable, etc.); compare the status information to life system threshold to determine, e.g., if a gas mixture is within acceptable mixture combinations or that the life system is in an unacceptable state. As another example, the AFCS 110 may obtain structural information from sensing devices indicating cabin breach (e.g., an opening, window, door, etc.); compare the structural information to structure threshold to determine, e.g., if a door or window is open or an opening was formed.

To determine whether a descent trigger condition is present, the AFCS 110 may determine a descent trigger condition is present when the safety data (or components thereof) are above, below, within relevant safety thresholds. As an example, the AFCS 110 may determine the cabin pressure data indicates the pressure of the internal compartment of the vehicle 100 is below the cabin pressure threshold and in response determine the descent trigger condition is present. As depicted in FIG. 2, at time t_trigger 210, the AFCS 110 may determine the descent trigger condition is present; and, in response, invoke and execute an automatic descent program that executes an automatic descent process. The automatic descent process, in the automatic descent program, may include: obtaining clearance data from an on-board system of the vehicle; generating a descent plan based on the clearance data, wherein the descent plan may include a supersonic-to-subsonic transition and/or a supersonic descent to a target altitude; and generating actuator instructions to execute the descent plan.

To obtain clearance data from an on-board system of the vehicle, the AFCS 110 may request/receive the clearance data a ground proximity warning system of the vehicle. However, generally, the AFCS 110 may request/receive the clearance data from one or more of: the ground proximity warning system of the vehicle, a weather system (e.g., weather radar of the vehicle or weather server of the vehicle or off-board), or a data server (on or off-board the vehicle). The clearance data may include one or combinations of: terrain data indicating an altitude of ground level from sea level; weather data indicating three-dimensional regions of weather and/or predicted weather; population data indicating population density or distribution; and/or the supersonic flight restrictions. To avoid large data storage/transfer cost/processing time, the AFCS 110 may determine a reference position and a range; and transmit a request (or filter clearance data already obtained) for clearance data within the range of the reference position. The reference position may be the position of the vehicle 110 at time t_trigger 210 or the next point on the planned flight path 205 (as monitored above). The range may be a predetermined distance (e.g., 50 miles) or may be variable based on, e.g., elevation variability in terrain (as elevation variability increases the range may increase).

To generate a descent plan based on the clearance data, the AFCS 110 may (1) select a descent maneuver; (2) check the selected descent maneuver based on the clearance data to determine whether the selected descent maneuver is acceptable; (3) in response to determining the selected descent maneuver is acceptable, confirm the selected descent maneuver as a confirmed descent maneuver; and (4) in response to determining the selected descent maneuver is not acceptable, (a) adjust the selected descent maneuver based on the clearance data to obtain the descent plan or (b) override a supersonic flight restriction.

To select the descent maneuver, the AFCS 110 may: obtain center of gravity (CG) information for the vehicle 100 and drag information for the vehicle 100, select an automated descent maneuver from among the plurality of maneuvers; and perform an analysis of the CG information, the drag information, and the automated descent maneuver to determine whether the planned trajectory is safe.

To obtain the CG information for the vehicle 100, the AFCS 110 may obtain CG information from another system (e.g., a fly by wire system) or generate the CG information based on the sensor data 50. For instance, to generate the CG information, the AFCS 110 may obtain and use a CG model from the performance database 120. The CG model may take as inputs fuel remaining and distribution (e.g., in various storage tanks) and attitude information (e.g., pitch, roll, and/or yaw, and rates thereof), and determine a CG location for the vehicle 100 based on a plurality of location, size, and weight for physical structures of the vehicle 100 and of the fuel in the storage tanks. A CG location may be a three-dimensional point based on a coordinate system with a defined center in or near the vehicle 100. The AFCS 110 may determine a current CG location (based on current data from the sensor data 50) and/or one or more predicted CG locations for points through a maneuver (based on expected data at the points). The CG information may include the current CG location (based on current data from the sensor data 50) and/or the one or more predicted CG locations for points through a maneuver.

To obtain the drag information for the vehicle 100, the AFCS 110 may obtain the drag information from another system (e.g., the fly by wire system) or generate the drag information based on the sensor data 50. For instance, to generate the drag information, the AFCS 110 may obtain and use a drag model from the performance database 120. The drag model may take as inputs external environment data (e.g., external air pressure, temperature, density, etc.), speed and attitude of the vehicle 110, and determine a drag force on the vehicle 100. The drag information may include the drag force determined by the drag model.

To select the automated descent maneuver from among the plurality of maneuvers, the AFCS 110 may select an automated descent maneuver based on a current altitude (obtained from, e.g., memory, the FMS 150, or the sensor data 50) and a target altitude 215. The AFCS 110 may obtain or include in descent meta-data from the performance database 120 about the plurality of maneuvers, such as expected change in altitude, type of maneuver (subsonic maneuver, supersonic maneuver, subsonic-to-supersonic, and supersonic-to-subsonic), etc. The target altitude 215 may be determined by original equipment manufacturers, regulations (e.g., from FAA), or based on context (e.g., for different circumstances the target altitude may be lower or higher). For instance, the AFCS 110 may select the automated descent maneuver to go from the current altitude to the target altitude, and to include one of: a supersonic-to-subsonic transition and/or a supersonic descent to the target altitude 215. As an example, the AFCS 110 may first select supersonic descent to an intermediate target altitude 215 (in order to meet a time to descend target, or based on stall speed restrictions until a safe altitude for subsonic flight is reached), then the AFCS 110 may select a supersonic-to-subsonic transition to complete the descent to the target altitude 215.

To obtain the selected automated descent maneuver, the AFCS 110 may obtain the automated descent maneuver from the performance database 120. The AFCS 110 may obtain the automated descent maneuver from the performance database 120 by finding a maneuver in the performance database 120 with a same identifier as an identifier indicated in the meta-data that matches, e.g., a change in altitude.

To perform the analysis of the CG information, the drag information, and the automated descent maneuver to determine whether the planned trajectory is safe, the AFCS 110 may use the prediction model to (1) determine an amount of space and/or time to execute the maneuver and (2) determine a starting point of the maneuver and an exit point of the maneuver; and compute the expected progression of the CG throughout the maneuver to determine appropriate time for supersonic to subsonic transition.

The prediction model may take as inputs a target flight path curve (e.g., a flight path curve of the selected automated descent maneuver), the flight envelope, external environment data (e.g., air pressure, wind, temperature, density, etc.), weight and fuel flow, and the drag information. The AFCS 110 may user the prediction model to predict an amount of space and/or time to execute the maneuver. For instance, the prediction model may have dynamic equations specific to the type of the vehicle 100 to predict a course (position with respect to time through maneuver) of the vehicle 100 through the maneuver and the change in CG expected through the maneuver, based on a state vector, possible control inputs to the actuation systems and associated outputs, external environmental data, and the drag information. The state vector may include position, velocity, acceleration, attitude (pitch, roll, yaw) and rates thereof for the vehicle 100. The possible control inputs may include inputs to control an elevator, throttle, aileron, rudder, etc., and the associated outputs may be what those control inputs would achieve, such as an amount of thrust, a change in pitch, a change in roll, etc. of the vehicle 100. The AFCS 110 may obtain the state vector by obtaining relevant data from the sensor data 50, such as position and velocity from GPS data and attitude and rates thereof from one or more gyroscopes. The AFCP 110 may obtain the possible control inputs and the associated outputs from the performance database 120.

The AFCS 110 may determine a starting point of the maneuver and an exit point of the maneuver, based on the predicted course (position with respect to time through maneuver) of the vehicle 100. The predicted course may indicate a time to complete the maneuver (e.g., thirty seconds to decelerate through transonic and achieve a speed at a target altitude) and a curve that the vehicle 100 is to proceed along to achieve the target altitude and speed. The curve may include a predicted starting point and a predicted ending point of the maneuver. The curve may indicate an amount of space to execute the maneuver, such as changes in altitude, latitude, and/or longitude from the predicted starting point to the predicted ending point.

To determine whether the selected automated descent maneuver has sufficient space, the AFCS 110 may predict the expected CG progression throughout the maneuver and compare it against the CG thresholds to maintain supersonic travel. For instance, to compare the expected CG progression (e.g., the CG information) to the CG thresholds, the AFCS 110 may determine a longitudinal CG component (e.g., forward or aft of the defined center) and/or a lateral CG component (e.g., left or right of the defined center) from the CG information for each the current CG location and/or the one or more predicted CG locations for points through a maneuver, as predicted in accordance with the predicted weight and fuel flow through the maneuver; and extract upper and lower longitudinal CG thresholds and upper and lower lateral CG thresholds from the CG thresholds. The AFCS 110 may then compare the determined longitudinal CG components to the upper and lower longitudinal CG thresholds to check that the determined longitudinal CG components are within the upper and lower longitudinal CG thresholds; and compare the determined lateral CG components to the upper and lower lateral CG thresholds to check that the determined lateral CG components are within the upper and lower lateral CG thresholds.

If the one of the longitudinal CG components or one of the lateral CG components are outside the upper and lower CG thresholds, the AFCS 110 may determine that the selected automated descent maneuver does not have sufficient space. If all of the longitudinal CG components and the lateral CG components are within the upper and lower CG thresholds, the AFCS 110 may determine that the selected automated descent maneuver does have sufficient space. If the AFCS 110 determines the planned trajectory does not have sufficient space (e.g., is not safe), the AFCS 110 may adjust the selected automated descent maneuver, as discussed below, and re-execute the analysis.

In one aspect of the disclosure, the upper and lower thresholds may be same or different for (1) when the descent is supersonic and (2) when the descent includes a transition from supersonic to subsonic. For instance, in the case of a supersonic-to-subsonic transition descent, the AFCS 110 may compare the CG projection against the CG thresholds (upper and lower) that allows recovery to subsonic given an available drag force of the drag information; in the case of a supersonic descent, the AFCS 110 may monitor the CG projection to an allowable CG threshold in order to maintain supersonic descent throughout.

To check the selected descent maneuver based on the clearance data to determine whether the selected descent maneuver is acceptable, the AFCS 110 may map the course; and determine whether the mapped course is acceptable based on the clearance data. To map the course, the AFCS 110 may align the predicted starting point at the current location of the vehicle 100 to determine the exit point based on the curve and the predicted ending point.

To determine whether the mapped course is acceptable based on the clearance data, the AFCS 110 may determine whether the determined exit point (or, generally, any points of the curve as the predicted starting point is aligned at the current location of the vehicle 100) is within a corridor of the terrain data, is within three-dimensional regions of weather and/or predicted weather of the weather data, and/or is within a supersonic flight restriction of the supersonic flight restrictions.

To determine whether a point (e.g., the determined exit point or, generally, any point of the curve) is within a corridor of the terrain data, the AFCS 110 may compare a location of the point (e.g., longitude and latitude, and altitude) to corridors in the terrain data; and if the location of the point is within one of the corridors, the AFCS 110 may determine the point is within a corridor. The corridors of the terrain data may be three-dimensional segments of airspace that indicate clear paths to fly for the vehicle 110 at the target altitude. For instance, the three-dimensional segments of airspace for the corridors may be determined by: comparing the target altitude to altitudes of ground level; and generating the three-dimensional segments of airspace by bounding regions with: a floor below the target altitude at a safe clearance threshold (e.g., 500 feet) from the altitudes of the ground level; and vertical planes at segments of ground that do not have the safe clearance threshold from the altitudes of the ground level.

To determine whether a point (e.g., the determined exit point or, generally, any points of the curve) is within three-dimensional regions of weather and/or predicted weather of the weather data, the AFCS 110 may compare the location of the point (e.g., longitude and latitude, and altitude) to the three-dimensional regions of weather and/or predicted weather of the weather data; and if the location of the point is within one of three-dimensional regions of weather and/or predicted weather of the weather data, the AFCS 110 may determine the point is within a three-dimensional region of weather and/or predicted weather of the weather data.

To determine whether a point (e.g., the determined exit point or, generally, any points of the curve) is within a supersonic flight restriction of the supersonic flight restrictions, the AFCS 110 may compare the location of the point (e.g., longitude and latitude, and altitude) to three-dimensional regions associated with the supersonic flight restrictions; and if the location of the point is within one of three-dimensional regions associated with supersonic flight restrictions, the AFCS 110 may determine the point is within a three-dimensional region of one of the supersonic flight restrictions.

In another aspect of the disclosure, to determine whether the mapped course is acceptable based on the clearance data may further include: determining whether the determined exit point (or, generally, any points of the curve as the predicted starting point is aligned at the current location of the vehicle 100) is within a population corridor. To determine whether a point (e.g., the determined exit point or, generally, any point of the curve) is within a population corridor of the population data, the AFCS 110 may compare a location of the point (e.g., longitude and latitude, and altitude) to population corridors in the population data; and if the location of the point is within one of the population corridors, the AFCS 110 may determine the point is within a population corridor. The population corridors of the population data may be three-dimensional segments of airspace above areas of population density/distribution above a population threshold. For instance, the three-dimensional segments of airspace for the population corridors may be determined by: comparing the population threshold to population density/distribution of the population data for particular areas of the population data; and generating the three-dimensional segments of airspace by bounding regions with: a floor above the areas with a population density/distribution above the population threshold; and vertical planes at segments of areas that do not have the population density/distribution above the population threshold.

If no point is outside a corridor of the terrain data, if no point is within any supersonic flight restriction, or if no point is within the three-dimensional regions of weather and/or predicted weather of the weather data (or, in the case that population data is used, if no point is within any population corridor), the AFCS 110 may determine the mapped course is acceptable. In response to determining the selected descent maneuver is acceptable, the AFCS 110 may confirm the selected descent maneuver as a confirmed descent maneuver.

If any point is outside any corridor of the terrain data, if any point is within any supersonic flight restriction, if any point is within the three-dimensional regions of weather and/or predicted weather of the weather data, (or, in the case that population data is used, if any point is within any population corridor), the AFCS 110 may determine the mapped course is not acceptable. In response to determining the selected descent maneuver is not acceptable, the AFCS 110 may (a) adjust the selected descent maneuver based on the clearance data to obtain the descent plan or (b) override a supersonic flight restriction.

To adjust the selected descent maneuver based on the clearance data to obtain the descent plan, the AFCS 110 may adjust a heading at the exit point, adjust the exit point, adjust a curve of the selected descent maneuver, etc. (1) to avoid the three-dimensional regions of weather and/or predicted weather, the supersonic flight restrictions, and/or the population corridors, and/or (2) aim for a closest corridor of the terrain data (e.g., closest to a exit point of the curve). The AFCS 110 may then re-execute the above sequence (e.g., analysis, check, adjust), until an acceptable descent maneuver is found, and confirm that acceptable maneuver as the confirmed descent maneuver.

Additionally or alternatively, to adjust the selected descent maneuver based on the clearance data to obtain the descent plan, the AFCS 110 may select a different one of the plurality of maneuvers as the adjusted automated descent maneuver, and re-execute the above sequence (e.g., analysis, check, adjust). The AFCS 110 may select different maneuvers until an acceptable descent maneuver is found, and confirm that acceptable maneuver as the confirmed descent maneuver.

To override a supersonic flight restriction, the AFCS 110 may determine that a point is within a supersonic flight restriction, and no point is within the three-dimensional regions of weather and/or predicted weather of the weather data and no point is outside a corridor of the terrain data. In this case, the AFCS 110 may automatically override the supersonic flight restriction, and proceed to confirm the descent maneuver as the descent plan.

In another aspect of the disclosure, to override the supersonic flight restriction, the AFCS 110 may cross-check the population data to determine a location within the corridor (and, optionally, outside any three-dimensional regions of weather and/or predicted weather of the weather data) for a sonic boom. For instance, the AFCS 110 may obtain the population data and determine areas within the population data (e.g., geographic areas of cities, towns, or rural areas, etc., based on population density or distribution) within the corridor (and, optionally, outside three-dimensional regions of weather and/or predicted weather of the weather data). Based on the areas, the AFCS 110 may (1) if the areas have different density or distribution, adjust the descent maneuver to (a) aim towards a less populated area or (b) avoid a higher populated area, and re-execute the sequence above; or (2) if the areas have a same or similar (e.g., within a predefined threshold difference) density or distribution, override the supersonic flight restriction, and proceed to confirm the descent maneuver as the descent plan. In this manner, the AFCS 110 may execute supersonic descents or supersonic-to-subsonic descents that may create sonic booms near less populated areas, rather than nearer higher populated areas.

In another aspect of the disclosure, to override the supersonic flight restriction, the AFCS 110 display a requested actin menu to the pilot/user of the vehicle 100 by a notice or alert on the display system 180/user interface system. The AFCS 110 may only override the supersonic flight restriction (1) if the user/pilot inputs a confirmation to the display 180/user interface system; and/or (2) after a threshold period of time (e.g., one minute) that the requested actin menu has been displayed to the user/pilot.

To generate actuator instructions to execute the descent plan, the AFCS 110 may generate a plurality of control inputs to control the vehicle 100 through the confirmed or adjusted automated descent maneuver. For instance, the plurality of control inputs may adjust the throttle and control surfaces to execute the confirmed or adjusted automated descent maneuver at specific times during the maneuver. The AFCS 110 may then execute the actuator instructions by controlling appropriate actuation systems of the vehicle 100, by e.g., transmitting the actuator instructions to various control inputs.

The AFCS 110 may notify the pilot/user of the vehicle 100 by a notice or alert on the display system 180, and/or audible notify the pilot/user (in the case of a user interface system). The notification may indicate that the AFCS 110 has confirmed an automated descent maneuver, and the notification may inform the pilot/user of the type of change (e.g., supersonic descent or supersonic to subsonic descent). In the case of an override of a supersonic flight restriction, the AFCS 110 may also notify the pilot/user that an supersonic flight restriction has been overridden. The AFCS 110 may also notify the pilot/user when the automated descent maneuver is being executed by the AFCS 110, such as at the start or continuously throughout the automated descent maneuver. The AFCS 110 may also notify the pilot/user when the vehicle 100 has exited transonic flight after the exit point.

the AFCS 110 may cross-check the population data to determine a location within the corridor (and, optionally, outside any three-dimensional regions of weather and/or predicted weather of the weather data) for a sonic boom. For instance, the AFCS 110 may obtain the population data and determine areas within the population data (e.g., geographic areas of cities, towns, or rural areas, etc., based on population density or distribution) within the corridor (and, optionally, outside three-dimensional regions of weather and/or predicted weather of the weather data). Based on the areas, the AFCS 110 may (1) if the areas have different density or distribution, adjust the descent maneuver to (a) aim towards a less populated area or (b) avoid a higher populated area, and re-execute the sequence above; or (2) if the areas have a same or similar (e.g., within a predefined threshold difference) density or distribution, override the supersonic flight restriction, and proceed to confirm the descent maneuver as the descent plan. In this manner, the AFCS 110 may execute supersonic descents or supersonic-to-subsonic descents that may create sonic booms near less populated areas, rather than nearer higher populated areas.

Therefore, the AFCS 110 (a fly by wire system or, generally, a control system 105 of the present disclosure) may check that the descent plan includes a descent maneuver that avoids populated areas, supersonic flight restriction areas, and/or weather, and aims for corridors where the vehicle may fly at the target altitude, so as to reduce sonic booms over populated areas, avoid areas where sonic booms are not allowed, and avoid weather (as weather is a complication in already non-standard operating condition). Moreover, the AFCS 110 may override a supersonic flight restriction automatically, in response to a user input, or based on a population analysis (e.g., to move any sonic booms to a lesser populated area). Therefore, the AFCS 110 may determine a transition maneuver for an automated descent mode of a vehicle and execute the transition maneuver out of supersonic flight, while considering various criteria (e.g., corridors, population, weather, and/or supersonic flight restrictions).

Figure 3A:
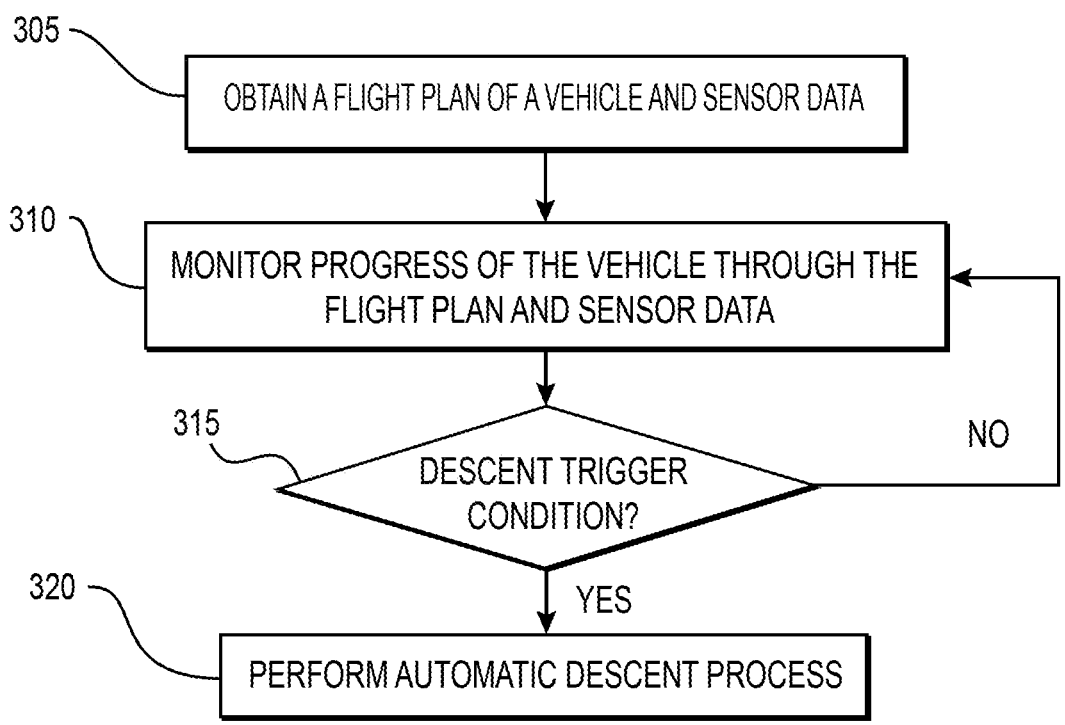
FIGS. 3A and 3B, respectfully, depict flowcharts for an automatic descent mode of a vehicle, according to one or more embodiments.
Figure 3B:
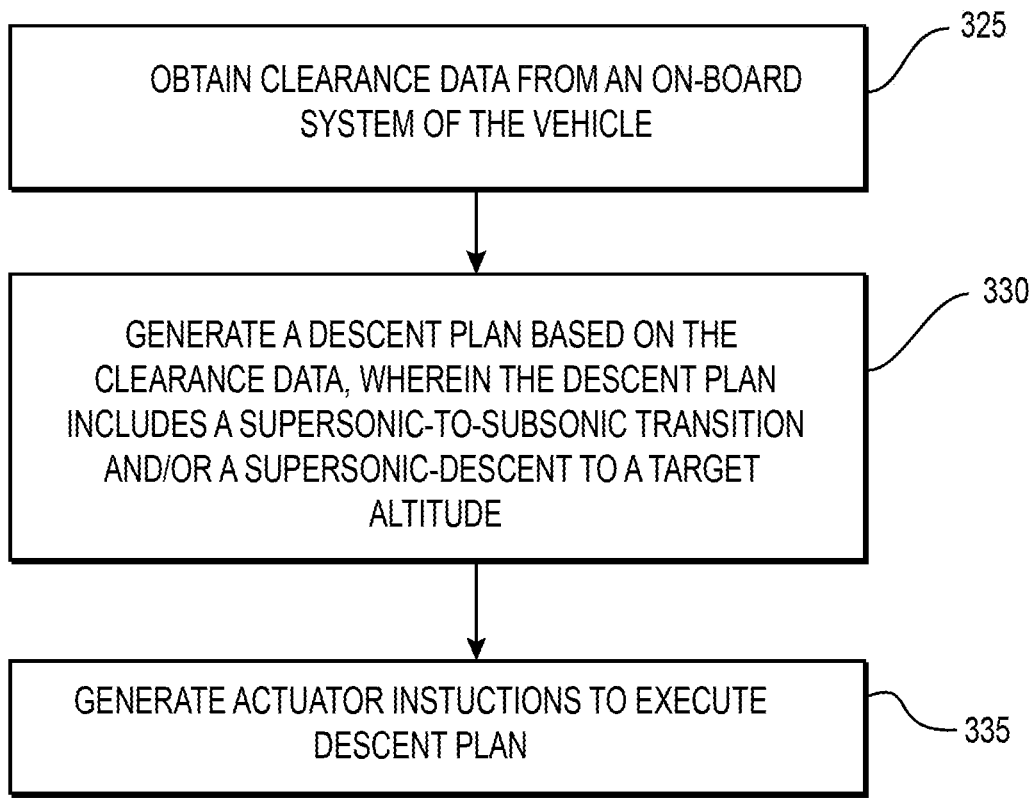

FIGS. 3A and 3B, respectfully, depict flowcharts for an automatic descent mode of a vehicle, according to one or more embodiments. Flowchart 300A of FIG. 3A may depict a trigger process, while flowchart 300B of FIG. 3B may depict an automated descent process. The flowcharts 300A and 300B may be performed by the AFCS 110.

The AFCS 110 may start the process of flowchart 300A to obtain a flight plan of a vehicle and sensor data (block 305). For instance, the AFCS 110 may receive the flight plan (or updates thereto) from the FMS 150 and cabin pressure data (from among the sensor data), as discussed above with respect to FIG. 1.

The AFCS 110 may continue the process to monitor progress of the vehicle through the flight plan and the sensor data (bock 310). For instance, the AFCS 110 may compare the positioning data to points of the planned flight path 205 and compare the cabin pressure data to a cabin pressure threshold, as discussed above with respect to FIG. 1.

The AFCS 110 may continue the process to determine whether a descent trigger condition is present (bock 315). For instance, the AFCS 110 may determine whether the cabin pressure data is below the cabin pressure threshold, as discussed above with respect to FIG. 1. In response to determining the descent trigger condition is not present (block 315: No), the AFCS 110 may return to monitor the progress of the vehicle through the flight plan and the sensor data (bock 310).

In response to determining the descent trigger condition is present (block 315: Yes), the AFCS 110 may perform an automatic descent process (block 320). For instance, the AFCS 110 may invoke the automatic descent program, as discussed above with respect to FIG. 1.

For instance, the AFCS 110 may start the process of flowchart 300B to obtain clearance data from an on-board system of the vehicle (block 325). For instance, the AFCS 110 may obtain the clearance data from a ground proximity warning system of the vehicle, as discussed above with respect to FIG. 1.

The AFCS 110 may continue the process to generate a descent plan based on the clearance data (bock 330), wherein the descent plan may include a supersonic-to-subsonic transition and/or a supersonic descent to a target altitude, as discussed above with respect to FIG. 1.

The AFCS 110 may continue the process to generate actuator instructions to execute the descent plan (bock 335). For instance, the AFCS 110 may generate actuator instructions, as discussed above with respect to FIG. 1.

Figure 4:
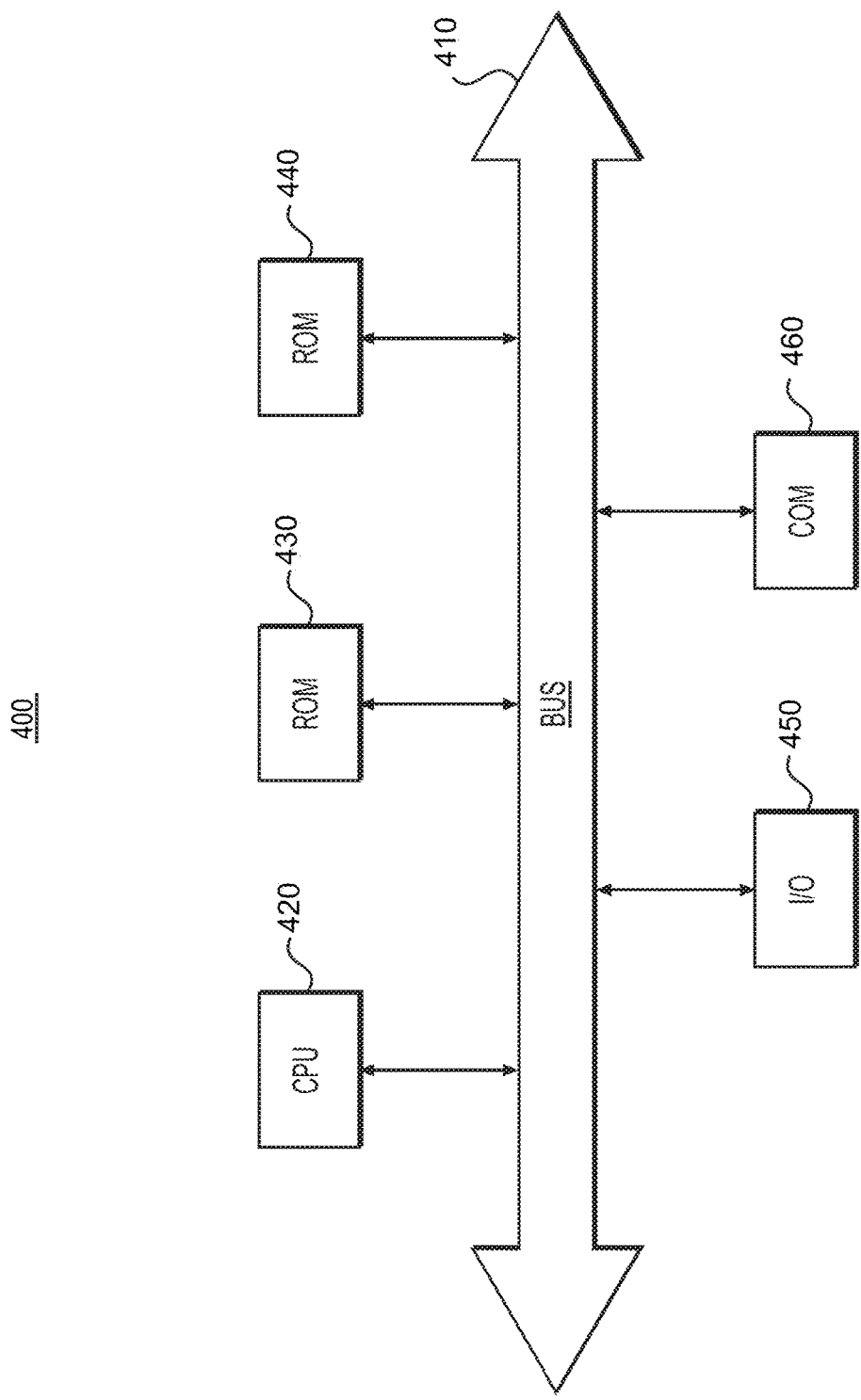
FIG. 4 depicts an example system that may execute techniques presented herein.

FIG. 4 depicts an example system that may execute techniques presented herein. FIG. 4 is a simplified functional block diagram of a computer that may be configured to execute techniques described herein, according to exemplary embodiments of the present disclosure. Specifically, the computer (or "platform" as it may not a be a single physical computer infrastructure) may include a data communication interface 460 for packet data communication. The platform may also include a central processing unit ("CPU") 420, in the form of one or more processors, for executing program instructions. The platform may include an internal communication bus 410, and the platform may also include a program storage and/or a data storage for various data files to be processed and/or communicated by the platform such as ROM 430 and RAM 440, although the system 400 may receive programming and data via network communications. The system 400 also may include input and output ports 450 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

The general discussion of this disclosure provides a brief, general description of a suitable computing environment in which the present disclosure may be implemented. In one embodiment, any of the disclosed systems, methods, and/or graphical user interfaces may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

The terminology used above may be interpreted in its broadest reasonable manner, even though it is being used in conjunction with a detailed description of certain specific examples of the present disclosure. Indeed, certain terms may even be emphasized above; however, any terminology intended to be interpreted in any restricted manner will be overtly and specifically defined as such in this Detailed Description section. Both the foregoing general description and the detailed description are exemplary and explanatory only and are not restrictive of the features, as claimed.

As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus. In this disclosure, relative terms, such as, for example, "about," "substantially," "generally," and "approximately" are used to indicate a possible variation of ±10% in a stated value. The term "exemplary" is used in the sense of "example" rather than "ideal." As used herein, the singular forms "a," "an," and "the" include plural reference unless the context dictates otherwise.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for controlling an automatic descent of a vehicle, the method comprising:
   determining whether a descent trigger condition is present; and
   in response to determining the descent trigger condition is present, performing an automatic descent process, the automatic descent process including:
      obtaining clearance data from an on-board system of the vehicle, wherein the clearance data includes one or more of: population data indicating population density or distribution; terrain data indicating an altitude of ground level from sea level; weather data indicating three-dimensional regions of weather and/or predicted weather; and/or supersonic flight restrictions;
      generating a descent plan based on the clearance data, the descent plan including a supersonic-to-subsonic transition and/or a supersonic-descent to a target altitude, wherein the generating the descent plan based on the clearance data includes:
         selecting a descent maneuver;
         determining a location of a sonic boom of the descent maneuver;

checking the selected descent maneuver based on the clearance data and the location of the sonic boom to determine whether the selected descent maneuver is acceptable; and in response to determining the selected descent maneuver is acceptable, confirming the selected descent maneuver as a confirmed descent maneuver; and generating actuator instructions to control the vehicle to descend to the target altitude based on the descent plan.

2. The method of claim 1, wherein the obtaining the clearance data includes requesting and receiving the clearance data (or portions thereof) from one or more of: a ground proximity warning system of the vehicle, a weather system, and/or a data server.

3. The method of claim 1, wherein the selecting the descent maneuver includes:

selecting the descent maneuver based on a current altitude and the target altitude, and to include one of: a supersonic-to-subsonic transition or a supersonic descent to the target altitude.

4. The method of claim 1, wherein checking the selected descent maneuver based on the clearance data and the location of the sonic boom to determine whether the selected descent maneuver is acceptable includes:

mapping a course of the selected descent maneuver; and determining whether the mapped course is acceptable based on the clearance data further comprises determining whether a point of the course is within a corridor of the terrain data, is within three-dimensional regions of weather and/or predicted weather of the weather data, and/or is within a supersonic flight restriction of supersonic flight restrictions.

determining whether the mapped course is acceptable based on the clearance data further comprises determining whether a point of the course is within a corridor of the terrain data, is within three-dimensional regions of weather and/or predicted weather of the weather data, and/or is within a supersonic flight restriction of supersonic flight restrictions.

5. The method of claim 4, wherein the determining whether the mapped course is acceptable includes:

in response to determining that no point is outside the corridor of the terrain data, no point is within any supersonic flight restriction, or no point is within the three-dimensional regions of weather and/or predicted weather of the weather data, determining the mapped course is acceptable;

in response to determining the selected descent maneuver is acceptable, confirming the selected descent maneuver as the confirmed descent maneuver;

in response to determining that any point is outside any corridor of the terrain data, any point is within any supersonic flight restriction, any point is within the three-dimensional regions of weather and/or predicted weather of the weather data, determining the mapped course is not acceptable; and in response to determining the selected descent maneuver is not acceptable, adjusting the selected descent maneuver based on the clearance data to obtain the descent plan, or overriding a supersonic flight restriction.

6. The method of claim 1, wherein the generating the descent plan based on the clearance data further includes:

in response to determining the selected descent maneuver is not acceptable, adjusting the selected descent maneuver based on the clearance data to obtain the descent plan, or overriding a supersonic flight restriction.

7. The method of claim 4, wherein checking the selected descent maneuver based on the clearance data to determine whether the selected descent maneuver is acceptable further comprises determining population density or distribution for one or more areas within the corridor of the terrain data, three-dimensional regions of weather and/or predicted weather of the weather data.

8. A system for controlling an automatic descent of a vehicle, the system comprising:

a memory storing instructions; and a processor executing the instructions to perform a process including:

determining whether a descent trigger condition is present; and in response to determining the descent trigger condition is present, performing an automatic descent process, the automatic descent process including:

obtaining clearance data from an on-board system of the vehicle, wherein the clearance data includes one or more of: population data indicating population density or distribution; terrain data indicating an altitude of ground level from sea level; weather data indicating three-dimensional regions of weather and/or predicted weather; and/or supersonic flight restrictions;

generating a descent plan based on the clearance data, the descent plan including a supersonic-to-subsonic transition and/or a supersonic-descent to a target altitude, wherein the generating the descent plan based on the clearance data includes:

selecting a descent maneuver;

determining a location of a sonic boom of the descent maneuver;

checking the selected descent maneuver based on the clearance data and the location of the sonic boom to determine whether the selected descent maneuver is acceptable; and in response to determining the selected descent maneuver is acceptable, confirming the selected descent maneuver as a confirmed descent maneuver; and generating actuator instructions to control the vehicle to descend to the target altitude based on the descent plan.

9. The system of claim 8, wherein the process further includes, to obtain the clearance data, requesting and receiving the clearance data (or portions thereof) from one or more of: a ground proximity warning system of the vehicle, a weather system, and/or a data server.

10. The system of claim 8, wherein the process further includes, to select the descent maneuver:

selecting the descent maneuver based on a current altitude and the target altitude, and to include one of: a supersonic-to-subsonic transition or a supersonic descent to the target altitude.

11. The system of claim 8, wherein checking the selected descent maneuver based on the clearance data and the location of the sonic boom to determine whether the selected descent maneuver is acceptable includes:

mapping a course of the selected descent maneuver; and determining whether the mapped course is acceptable based on the clearance data further comprises determining whether a point of the course is within a corridor of the terrain data, is within three-dimensional regions of weather and/or predicted weather of the weather data, and/or is within a supersonic flight restriction of supersonic flight restrictions.

12. The system of claim 11, wherein the process further includes, to determine whether the mapped course is acceptable includes:
in response to determining that no point is outside the corridor of the terrain data, no point is within any supersonic flight restriction, or no point is within the three-dimensional regions of weather and/or predicted weather of the weather data, determining the mapped course is acceptable;
in response to determining the selected descent maneuver is acceptable, confirming the selected descent maneuver as the confirmed descent maneuver;
in response to determining that any point is outside any corridor of the terrain data, any point is within any supersonic flight restriction, any point is within the three-dimensional regions of weather and/or predicted weather of the weather data, determining the mapped course is not acceptable; and
in response to determining the selected descent maneuver is not acceptable,
adjusting the selected descent maneuver based on the clearance data to obtain the descent plan, or
overriding a supersonic flight restriction.

13. The system of claim 11, wherein checking the selected descent maneuver based on the clearance data to determine whether the selected descent maneuver is acceptable further comprises determining population density or distribution for one or more areas within the corridor of the terrain data, three-dimensional regions of weather and/or predicted weather of the weather data.

14. The system of claim 8, wherein the process further includes, to generate the descent plan based on the clearance data:
in response to determining the selected descent maneuver is not acceptable,
adjusting the selected descent maneuver based on the clearance data to obtain the descent plan, or
overriding a supersonic flight restriction.

15. A non-transitory computer-readable medium storing instructions that, when executed by a processor, cause the processor to perform a method for controlling an automatic descent of a vehicle, the method comprising:
determining whether a descent trigger condition is present; and
in response to determining the descent trigger condition is present, performing an automatic descent process, the automatic descent process including:
obtaining clearance data from an on-board system of the vehicle, wherein the clearance data includes one or more of: population data indicating population density or distribution; terrain data indicating an altitude of ground level from sea level; weather data indicating three-dimensional regions of weather and/or predicted weather; and/or supersonic flight restrictions;
generating a descent plan based on the clearance data, the descent plan including a supersonic-to-subsonic transition and/or a supersonic-descent to a target altitude, wherein the generating the descent plan based on the clearance data includes:
selecting a descent maneuver;
determining a location of a sonic boom of the descent maneuver;
checking the selected descent maneuver based on the clearance data and the location of the sonic boom to determine whether the selected descent maneuver is acceptable; and
in response to determining the selected descent maneuver is acceptable, confirming the selected descent maneuver as a confirmed descent maneuver; and
generating actuator instructions to control the vehicle to descend to the target altitude based on the descent plan.

16. The non-transitory computer-readable medium of claim 15, wherein the obtaining the clearance data includes requesting and receiving the clearance data (or portions thereof) from one or more of: a ground proximity warning system of the vehicle, a weather system, and/or a data server.

17. The non-transitory computer-readable medium of claim 15, wherein the selecting the descent maneuver includes:
selecting the descent maneuver based on a current altitude and the target altitude, and to include one of: a supersonic-to-subsonic transition or a supersonic descent to the target altitude.

18. The non-transitory computer-readable medium of claim 15, wherein checking the selected descent maneuver based on the clearance data and the location of the sonic boom to determine whether the selected descent maneuver is acceptable includes:
mapping a course of the selected descent maneuver; and
determining whether the mapped course is acceptable based on the clearance data further comprises determining whether a point of the course is within a corridor of the terrain data, is within three-dimensional regions of weather and/or predicted weather of the weather data, and/or is within a supersonic flight restriction of supersonic flight restrictions.

19. The non-transitory computer-readable medium of claim 15, wherein the generating the descent plan based on the clearance data further includes:
in response to determining the selected descent maneuver is not acceptable,
adjusting the selected descent maneuver based on the clearance data to obtain the descent plan, or
overriding a supersonic flight restriction.

20. The non-transitory computer-readable medium of claim 15, wherein checking the selected descent maneuver based on the clearance data to determine whether the selected descent maneuver is acceptable further comprises determining population density or distribution for one or more areas within the corridor of the terrain data, three-dimensional regions of weather and/or predicted weather of the weather data.

* * * * *